US011920265B2

(12) United States Patent
Heo et al.

(10) Patent No.: US 11,920,265 B2
(45) Date of Patent: Mar. 5, 2024

(54) MULTI-LAYER FABRIC

(71) Applicant: KOLON INDUSTRIES, INC., Seoul (KR)

(72) Inventors: Jin Wook Heo, Seoul (KR); Il Chung, Seoul (KR); Ki Jeong Kim, Seoul (KR); Hyo Eun Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 195 days.

(21) Appl. No.: 17/629,808

(22) PCT Filed: Sep. 28, 2020

(86) PCT No.: PCT/KR2020/013176
§ 371 (c)(1),
(2) Date: Jan. 25, 2022

(87) PCT Pub. No.: WO2021/066439
PCT Pub. Date: Apr. 8, 2021

(65) Prior Publication Data
US 2022/0251740 A1     Aug. 11, 2022

(30) Foreign Application Priority Data

Sep. 30, 2019 (KR) .................. 10-2019-0121187
Sep. 25, 2020 (KR) .................. 10-2020-0125231

(51) Int. Cl.
*D03D 1/02*   (2006.01)
*D03D 11/00*  (2006.01)
(Continued)

(52) U.S. Cl.
CPC .............. *D03D 11/00* (2013.01); *D03D 1/02* (2013.01); *D03D 15/283* (2021.01); *D03D 15/573* (2021.01); *D10B 2505/124* (2013.01)

(58) Field of Classification Search
CPC ........ D03D 11/00; D03D 1/02; D03D 15/283; D03D 15/573; D03D 13/004; D03D 11/02;
(Continued)

(56) References Cited

U.S. PATENT DOCUMENTS 4,840,397 A * 6/1989 Katz .................... B01D 39/083
                                                   280/739
5,073,418 A * 12/1991 Thornton ................. D03D 1/02
                                                   139/389
(Continued)

FOREIGN PATENT DOCUMENTS

CN        103582726 A     2/2014
DE        10142130 A1     3/2003
(Continued)

OTHER PUBLICATIONS

The Office Action dated Jun. 15, 2023, of the corresponding Canadian Patent Application.
International Search Report dated Jan. 6, 2021.

*Primary Examiner* — Robert H Muromoto, Jr.
(74) *Attorney, Agent, or Firm* — Harvest IP Law, LLP

(57) ABSTRACT

A multi-layer fabric, and an airbag formed of the multi-layer fabric are provided. The multi-layer fabric can provide an airbag capable of sufficiently protecting a driver or a passenger by minimizing damage caused by broken glass fragments when a vehicle is overturned. The multi-layer fabric includes an inflating part, and a co-woven part surrounding the inflating part. At least one layer of the inflating part includes a first region formed of two or more types of weaves comprising 1/1 plain weave.

9 Claims, 3 Drawing Sheets

(51) Int. Cl.
*D03D 15/283* (2021.01)
*D03D 15/573* (2021.01)
*B60R 21/235* (2006.01)

(58) Field of Classification Search
CPC ........ D10B 2505/124; D10B 2401/063; B60R 2021/23547; B60R 21/235; B60R 21/16
See application file for complete search history.

(56) References Cited

U.S. PATENT DOCUMENTS

| | | | | |
|---|---|---|---|---|
| 5,131,434 | A * | 7/1992 | Krummheuer | B60R 21/235 139/389 |
| 5,842,551 | A * | 12/1998 | Nels | D03D 3/02 192/113.36 |
| 5,998,311 | A * | 12/1999 | Nels | F16D 23/025 192/113.36 |
| 6,334,467 | B1 * | 1/2002 | Barrett | D21F 1/0036 162/902 |
| 6,810,917 | B2 * | 11/2004 | Stone | D21F 1/0036 162/903 |
| 6,994,125 | B2 * | 2/2006 | Trondle | D03D 1/02 428/101 |
| 7,681,602 | B2 * | 3/2010 | Youn | D03D 1/02 139/383 R |
| 8,147,653 | B2 * | 4/2012 | Stone | D21F 1/0045 139/425 A |
| 9,656,624 | B2 * | 5/2017 | Kim | B60R 21/13 |
| 2004/0029477 | A1 | 2/2004 | Rose | |
| 2004/0182468 | A1 * | 9/2004 | Trondle | D03D 1/02 139/408 |
| 2005/0011578 | A1 | 1/2005 | Walsh | |
| 2005/0130520 | A1 * | 6/2005 | Mouri | D03D 1/02 442/59 |
| 2006/0096073 | A1 * | 5/2006 | Stoppa | D03D 15/56 28/165 |
| 2007/0259583 | A1 * | 11/2007 | Laycock | D02G 3/324 442/184 |
| 2010/0253047 | A1 * | 10/2010 | Youn | B60R 21/235 139/384 R |
| 2011/0114278 | A1 * | 5/2011 | Stone | D21F 1/0045 162/289 |
| 2012/0043745 | A1 | 2/2012 | Bae | |
| 2014/0021705 | A1 * | 1/2014 | Youn | B60R 21/232 139/413 |
| 2016/0207491 | A1 * | 7/2016 | Kim | B60R 21/264 |
| 2019/0145028 | A1 * | 5/2019 | Jones | D03D 15/283 139/420 A |
| 2019/0284730 | A1 * | 9/2019 | Wang | D02G 3/38 |
| 2021/0010170 | A1 * | 1/2021 | Ranganathan | D03D 15/49 |
| 2022/0251740 | A1 | 8/2022 | Heo | |

FOREIGN PATENT DOCUMENTS

| | | |
|---|---|---|
| EP | 2692920 A2 | 2/2014 |
| EP | 4006220 A1 | 6/2022 |
| JP | 2003-267176 A | 9/2003 |
| JP | 2008144309 A | 6/2008 |
| JP | 2009-511759 A | 3/2009 |
| JP | 2014-113989 A | 6/2014 |
| JP | 2014-514470 A | 6/2014 |
| JP | 2017-193319 A | 10/2017 |
| JP | 2018-114958 A | 7/2018 |
| KR | 100853117 B1 | 8/2008 |
| KR | 20090072245 A | 7/2009 |
| KR | 1020120112219 A | 10/2012 |
| KR | 1020140087848 A | 7/2014 |
| KR | 2016-0148384 A | 12/2016 |
| WO | 2021-066439 A1 | 4/2021 |

\* cited by examiner

[FIG. 1]
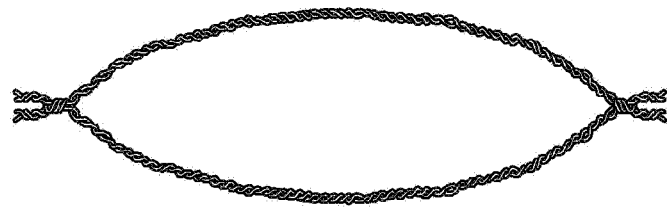

[FIG. 2]
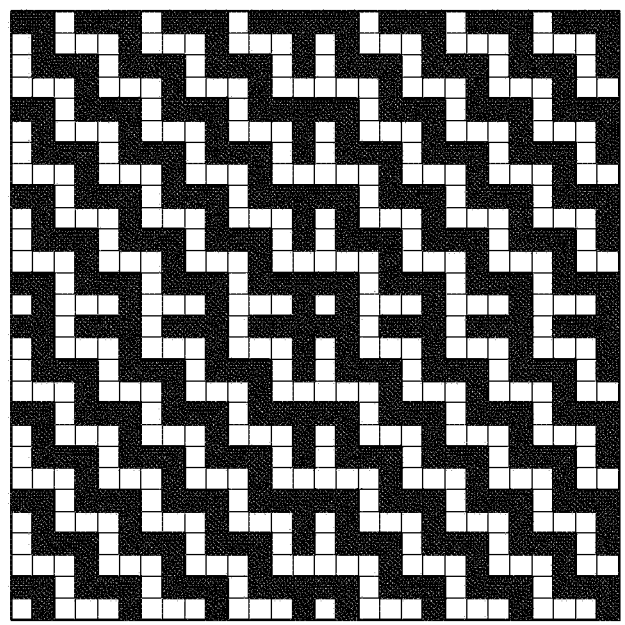
[FIG. 3]
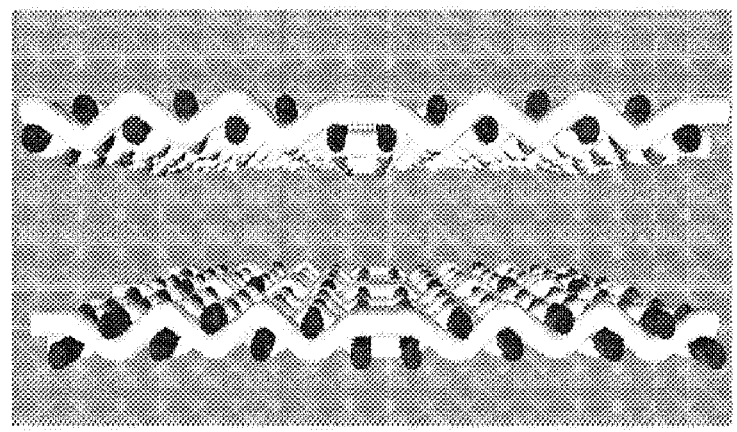

[FIG. 4]
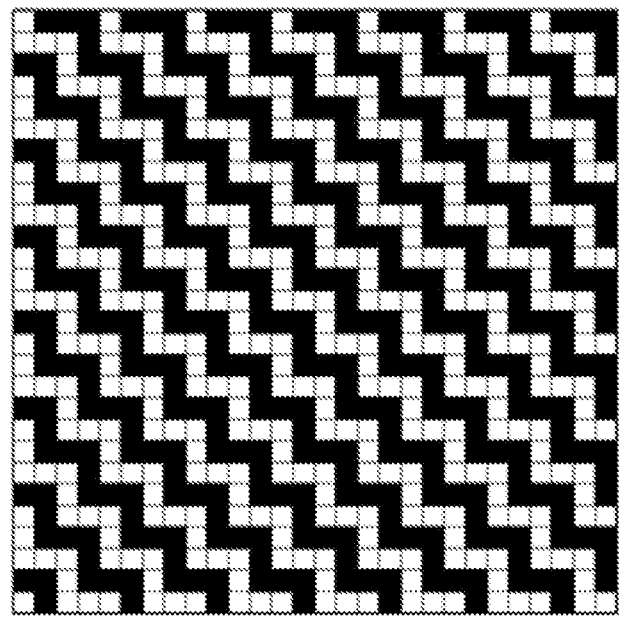
[FIG. 5]
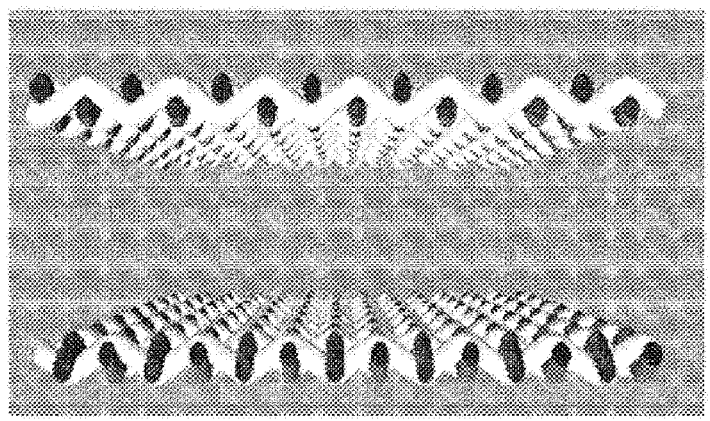

MULTI-LAYER FABRIC

CROSS REFERENCE TO RELATED APPLICATION(S)

This application is a National Stage of International Application No. PCT/KR2020/013176 filed on Sep. 28, 2020, claiming the benefits of Korean Patent Application No. 10-2019-0121187 filed on Sep. 30, 2019 and 10-2020-0125231 filed on Sep. 25, 2020 with the Korean Intellectual Property Office, the disclosure of which is incorporated herein by reference in its entirety.

TECHNICAL FIELD

The present disclosure related to a multi-layer fabric

BACKGROUND OF ART

In recent years, there has been a demand for improvement in the safety of a driver or a passenger in the event of a traffic collision such as a motor vehicle collision, and thus various airbags are being installed more frequently. A sensor of an airbag detects the impact that a transportation vehicle receives during a head-on collision or a side collision, and the airbag is rapidly deployed and inflated by introducing gas from an inflator into inflatable bubbles. Then, the airbag protects the human body by alleviating the impact that the driver or passenger will receive with cushioning properties of the inflated bubbles.

In the past, airbags were installed on the front part such as on the driver's seat or on the driver's seat and the front passenger's seat, and were mainly installed to protect the face and upper body of a passenger in the case of a head-on collision. However, in recent years, curtain-type airbags capable of responding to a side-on collision or rollover of the vehicle have also been developed.

This curtain-type airbag is designed to be stored in the area from a front pillar to a rear pillar along a roof rail of the side wall of a vehicle, and to inflate and deploy along the side window in the event of a collision. The curtain-type airbag is required to have excellent storage capacity (it should be compactly foldable). In addition, since a distance between the passenger's head and the side glass is short, it is necessary to momentarily pinch between the passenger's head and the glass to protect the head in the event of a side collision, so the curtain-type airbag is required to inflate and deploy quickly. Further, the airbag is required to maintain a certain internal pressure for several seconds after deployment in the event of a rollover. However, it is very rare that the side glass does not break when the vehicle is overturned, and the airbag is easily torn by the broken side glass fragments, making it difficult to protect passengers.

DETAILED DESCRIPTION OF THE INVENTION

Technical Problem

In the present disclosure, there is provided a multi-layer fabric capable of minimizing damage caused by broken glass fragments.

In the present disclosure, there is also provided an airbag formed of the multi-layer fabric.

Technical Solution

Hereinafter, a multi-layer fabric and an airbag formed using the same according to specific embodiments of the present invention will be described.

According to an embodiment of the present disclosure, there is provided a multi-layer fabric including an inflating part; and a co-woven part surrounding the inflating part, wherein at least one layer of the inflating part comprises a first region formed of two or more types of weaves including 1/1 plain weave.

The multi-layer fabric is manufactured without a sewing part by a one-piece woven method, and may be a one-piece woven fabric including an inflating part having a structure of two or more separated layers and a co-woven part surrounding the inflating part.

The multi-layer fabric can be inflated by the airframe, so it is being used in vehicle airbags and life jackets. In particular, the multi-layer fabric used in the vehicle airbag needs to remain inflated to protect the driver or passenger when the vehicle rolls over. However, there is a problem in that the multi-layer fabric used for the airbag is torn by broken glass fragments of the vehicle, and thus does not sufficiently protect the driver or passenger.

It has been found that the introduction of a specific weave pattern to the multi-layer fabric can minimize the damage by broken glass fragments while maintaining superior properties of the one-piece woven fabric, thereby completing the present invention.

The inflating part of the multi-layer fabric has a structure of two or more separated layers, and for example, may have a structure of two layers, a structure of three layers, or a structure of four layers. In addition, the layer constituting the inflating part is a fabric, and may be referred to as a fabric layer in the present disclosure.

The inflating part is closed by a co-woven part surrounding it, so that when gas is supplied to the inflating part, the supplied gas may be confined and the inflating part may inflate.

The multi-layer fabric is a one-piece woven fabric manufactured by a one-piece woven method, and the co-woven part may refer to a group of woven points (co-woven points) formed along the edge of the inflating part by crossing the yarn (warp or weft) of one fabric layer constituting the inflating part with the yarn (weft or warp) of another fabric layer. More specifically, the co-woven part may be a group of woven points formed along the edge of the inflating part by crossing the warp of one fabric layer constituting the inflating part with the weft of another fabric layer, or a group of woven points by crossing the warp and weft of one fabric layer constituting the inflating part with the weft and warp of another fabric layer, respectively. When the multi-layer fabric includes the inflating part having a structure of three or more separated layers, the yarns of the two outermost fabric layers are crossed to form woven points along the edge of the inflating part to close the inflating part. Of course, a part for introducing a configuration necessary in the art, such as an inlet for supplying gas to the inflating part, may be manufactured in an unclosed state.

In the present disclosure, a double-layer fabric having a structure of two layers will be described in detail as the multi-layer fabric, but these contents may be applied to a multi-layer fabric having a structure of three or more layers as it is.

The multi-layer fabric, as shown in FIG. 1, may be a double-layer fabric having a structure in which two separated fabric layers and outer periphery of the two fabric layers are co-woven by a co-woven part.

The multi-layer fabric according to the embodiment may include a first region in which at least one layer constituting the inflating part is formed of two or more types of weaves including 1/1 plain weave.

Fabrics woven with 1/1 plain weave tend to have high tensile strength but low tear strength because the yarns are densely filled. Tear strength in fabrics means a strength of the force required to break the yarns forming the warp or weft. When a force is applied to only one strand of yarn, the yarn is momentarily broken, but when the same force is applied to two or more yarns, the yarn is pushed out by the force rather than being broken. This yarn movement occurs more frequently in other weaves than in 1/1 plain weave, so fabrics woven with weaves other than 1/1 plain weave can exhibit relatively high tear strength compared to fabrics woven with 1/1 plain weave. However, fabrics woven with weaves other than 1/1 plain weave have very low tensile strength compared to fabrics woven with 1/1 plain weave, so they are not suitable for airbag fabrics.

Accordingly, the multi-layer fabric according to the embodiment includes a first region in which at least one layer constituting the inflating part is formed of two or more types of weaves including 1/1 plain weave, so that it is not easily torn by sharp objects such as broken glass fragments and exhibits excellent mechanical properties such as tensile strength.

In addition, the remaining area excluding the first area in the layer constituting the inflating part may be composed of a second area formed of 1/1 plain weave.

As a result, the multi-layer fabric exhibits excellent tensile strength similar to that of 1/1 plain weave fabric and significantly improved tear strength compared to 1/1 plain weave fabric, so that it can be suitably used for curtain-type airbags stored in locations that are easily torn by glass fragments.

In particular, in the first region, a weave other than 1/1 plain weave is inserted every 2 to 15 1/1 plain weave, so that the multi-layer fabric exhibits excellent tensile strength similar to that of 1/1 plain weave, and significantly improved tear strength compared to 1/1 plain weave.

More specifically, the first region may be woven in a pattern in which a weave other than 1/1 plain weave is inserted every 2 to 15, 2 to 13, 2 to 11, 3 to 15, 5 to 15, 3 to 13, 5 to 11, 2 to 5, 3 to 5, or about 5 1/1 plain weave. The multi-layer fabric including the first region may exhibit significantly improved tear strength compared to general OPW fabric formed of only 1/1 plain weave, and the airbag manufactured from this multi-layer fabric may exhibit excellent airtightness even after deployment.

The weave other than 1/1 plain weave may be inserted every above-described predetermined number of 1/1 plain weave in the warp direction of the fabric layer, every above-described predetermined number of 1/1 plain weave in the weft direction, or every above-described predetermined number of 1/1 plain weave in both warp and weft directions.

Among them, it is advantageous to insert the weave other than 1/1 plain weave every above-described predetermined number of 1/1 plain weave in both the warp and weft directions of the fabric layer, as it is possible to further improve tear strength while maintaining excellent durability of the multi-layer fabric.

1 to 5, 1 to 3, 1 to 2, or 1 weave other than 1/1 plain weave may be inserted every above-described predetermined number of 1/1 plain weave. Within this range, it is possible to improve tear strength while maintaining excellent overall properties of the multi-layer fabric.

At least one layer of the inflating part may include the first region in an area ratio of 5% to 50% of a total area of the corresponding layer. Within this range, a sufficient effect of improving tear strength may be exhibited, and excellent airtightness may be exhibited even when the inflating part is rapidly deployed due to a sudden inflow of air.

Two or more types of weaves including 1/1 plain weave may be 1/1 plain weave and one or more weaves selected from a group consisting of 2/1 twill weave, 3/1 satin weave, 2/2 basket weave, and 3/3 basket weave.

When the weave other than 1/1 plain weave is 4/1, 5/1, or 4/4 weave other than the above-mentioned weave, the tear strength may increase, but it may be difficult to use it for airbags due to deterioration in various characteristics such as elongation and airtightness, which are essential as airbag fabrics.

Among them, it is advantageous to apply the 1/1 plain weave and at least one weave selected from the group consisting of 2/1 twill weave, and 3/1 satin weave as the two or more types of weaves including 1/1 plain weave, because the tear strength can be improved while maintaining excellent durability of the multi-layer fabric. In particular, it is possible to provide a multi-layer fabric having excellent tear strength and durability by applying 1/1 plain weave and 2/1 twill weave as the two or more types of weaves including 1/1 plain weave.

Meanwhile, when the weave other than 1/1 plain weave is inserted in both the warp and weft directions of the fabric layer, a different weave such as 2/1 twill weave, 3/1 satin weave, 2/2 basket weave, 3/3 basket weave, or rip-stop may be implemented at a point where the weave other than 1/1 plain weave crosses.

For example, as shown in FIG. 2, when 2/1 twill weave is inserted every certain number of 1/1 plain weave in both the warp and weft directions, 2/2 basket weave will be implemented at the point where the 2/1 twill weave crosses.

The first region may be inserted into the outermost fabric layer of the multi-layer fabric to effectively prevent the multi-layer fabric from being torn by an external sharp object. When the multi-layer fabric is a double-layer fabric, the first region may be inserted into both fabric layers, and when the multi-layer fabric is a multi-layer fabric having three or more fabric layers, the first region may be inserted into the outer two fabric layers.

The yarn for weaving the multi-layer fabric may be, for example, nylon 66, nylon 6, nylon 46, nylon 610, or nylon 612 alone, or a polyamide fiber obtained by copolymerization or mixing thereof; or polyethylene terephthalate, polytrimethylene terephthalate, polybutylene terephthalate, or polyethylene naphthalate alone, or a polyester fiber obtained by copolymerization or mixing thereof.

The fineness of the yarn for weaving the multi-layer fabric may be 300 to 700 dtex. Within this range, it can inflate into a desired shape while satisfying the characteristics required for deployment and expansion, and the bubble becomes flexible to improve storage properties, resulting in high-speed deployment.

The multi-layer fabric may exhibit excellent tear strength by including the inflating part woven in the above-described characteristic pattern. In particular, in the first region of the multi-layer fabric, the tear strength in the warp direction measured according to ISO 13937-2 may be 300 to 800 N, 400 to 750 N, 500 to 700 N, 550 to 650 N, or 600 to 650 N, and the tear strength in the weft direction may be 350 to 900 N, 450 to 850 N, 500 to 800 N, 600 to 800 N, 650 to 750 N, or 700 to 750 N.

In addition, although the multi-layer fabric exhibits excellent tear strength, it can exhibit high tensile strength and elongation similar to those of a conventional 1/1 plain weave fabric. In particular, in the first region of the multi-layer fabric, the tensile strength in the warp direction measured according to ISO 13934-1 may be 3200 to 3500 N/5 cm, 3300 to 3500 N/5 cm or 3400 to 3500 N/5 cm, and the tensile strength in the weft direction may be 2800 to 3300 N/5 cm, 3000 to 3300 N/5 cm, 3050 to 3300 N/5 cm, or 3100 to 3300 N/5 cm. In addition, in the first region of the multi-layer fabric, the elongation in the warp direction measured according to ISO 13934-1 may be 25% to 45%, 30% to 45% or 35% to 45%, and the elongation in the weft direction may be 20% to 40%, 25% to 40% or 27% to 40%. The methods of measuring the tear strength, tensile strength, and elongation are specified in Test Examples to be described later.

When the multi-layer fabric is used in an airbag for a vehicle, one or both surfaces of the multi-layer fabric may be coated to prevent air leakage through gaps in the fabric. The multi-layer fabric may be coated with a resin typically used for fiber coating, and may be coated with, but not limited to, a silicone resin, a urethane-based resin, an olefin-based resin, or a mixture thereof. The multi-layer fabric may be coated with the resin by a knife coating method, a doctor blade method, a spray coating method, or the like, and the resin may preferably be coated by a knife coating method.

The coating of the multi-layer fabric may be performed by a multi-step coating method of coating two or more times. When using such a multi-step coating method, airtightness can be improved and flexibility can be secured by reducing a thickness of the fabric compared to the coating amount.

The coating amount of the resin may be adjusted to about 30 g/m$^2$ to 150 g/m$^2$, about 50 g/m$^2$ to 150 g/m$^2$, about 60 g/m$^2$ to 150 g/m$^2$, or about 70 g/m$^2$ to 150 g/m$^2$. Accordingly, it is possible to provide a lightweight multi-layer fabric having excellent air pressure resistance and storage properties without causing problems such as a decrease in blocking resistance due to surface stickiness or an increase in cost.

When the resin is coated in a multi-step coating method, the above-described effect may be further maximized by adjusting the coating amount of the base coating layer to 60 g/m$^2$ to 75 g/m$^2$.

Meanwhile, according to another embodiment of the present disclosure, there is provided an airbag formed of the multi-layer fabric. The multi-layer fabric exhibits not only excellent properties of a one-piece woven fabric, but also significantly improved tear strength with the specific weave pattern described above, and thus is not easily torn by broken glass fragments. Accordingly, the airbag formed of the multi-layer fabric can sufficiently protect a driver or a passenger from broken glass fragments even when the vehicle is overturned.

Advantageous Effects

The multi-layer fabric according to an embodiment of the present disclosure can provide an airbag capable of sufficiently protecting a driver or a passenger by minimizing damage caused by broken glass fragments when a vehicle is overturned.

BRIEF DESCRIPTION OF THE DRAWINGS

FIG. 1 shows a cross-section of a double-layer fabric according to an embodiment of the present disclosure.

FIG. 2 is a weave diagram of the first region in which 2/1 twill weave is inserted into 1/1 plain weave according to an embodiment of the present disclosure.

FIG. 3 shows a weave structure of a double-layer fabric including the first region of FIG. 2

FIG. 4 is a weave diagram of a fabric showing 1/1 plain weave of Comparative Example 1.

FIG. 5 shows a weave structure of a double-layer fabric according to the weave diagram of the fabric of FIG. 4.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Example 1: Preparation of Double-Layer Fabric

A double-layer fabric was prepared on a jacquard machine using 470 dtex of polyamide (nylon 66) yarn.

The double-layer fabric, as shown in FIG. 1, has a structure in which two separate fabric layers and outer periphery of the two fabric layers are co-woven, and was woven at a time by a one-piece woven method.

The two fabric layers separated from each other were prepared to include a first region woven such that 2/1 twill weave was placed every three 1/1 plain weave in both warp and weft directions, respectively, as shown in FIGS. 2 and 3.

After coating 75 g/m$^2$ of silicone resin on both sides of the prepared double-layer fabric using a knife, the temperature was gradually raised to 90° C. to 150° C. to perform primary curing, followed by heat-treatment at 180° C. to prepare a coated double-layer fabric.

Example 2: Preparation of Double-Layer Fabric

A coated double-layer fabric was prepared in the same manner as in Example 1, except that the first region was woven such that 2/1 twill weave was placed every five 1/1 plain weave in both warp and weft directions.

Example 3: Preparation of Double-Layer Fabric

A coated double-layer fabric was prepared in the same manner as in Example 1, except that the first region was woven such that 2/1 twill weave was placed every eleven 1/1 plain weave in both warp and weft directions.

Example 4: Preparation of Double-Layer Fabric

A coated double-layer fabric was prepared in the same manner as in Example 1, except that the first region was woven such that 2/1 twill weave was placed every thirteen 1/1 plain weave in both warp and weft directions.

Example 5: Preparation of Double-Layer Fabric

A coated double-layer fabric was prepared in the same manner as in Example 2, except that the weave pattern was changed such that 3/1 satin weave was placed instead of 2/1 twill weave in the first region of Example 2.

Comparative Example 1: Preparation of Double-Layer Fabric

A coated double-layer fabric was prepared in the same manner as in Example 1, except that the double-layer fabric was prepared by weaving only 1/1 plain weave as shown in FIGS. 4 and 5.

Test Example: Evaluation of Physical Properties of Double-Layer Fabric

Five samples were prepared in each of the first regions of the double-layer fabrics prepared in Examples 1 to 5, and 5 samples were prepared in the double-layer fabric prepared in Comparative Example 1. Then, physical properties of the prepared samples were evaluated by the method described below, and the average value was obtained and shown in Table 1.

1. Tear Strength

The tear strength in the warp direction and the tear strength in the weft direction of the prepared samples were measured. The tear strength was measured according to ISO 13937-2 after the sample was left at room temperature for 24 hours, and the tear strength in the warp direction and the tear strength in the weft direction were measured, respectively, followed by obtaining an average value thereof.

2. Elongation

The elongation in the warp direction and the elongation in the weft direction of the prepared samples were measured. The elongation was measured according to ISO 13934-1 after the sample was left at room temperature for 24 hours, and the elongation in the warp direction and the elongation in the weft direction were measured, respectively, followed by obtaining an average value thereof.

3. Tensile Strength

The tensile strength in the warp direction and the tensile strength in the weft direction of the prepared samples were measured. The tensile strength was measured according to ISO 13934-1 after the sample was left at room temperature for 24 hours, and the tensile strength in the warp direction and the tensile strength in the weft direction were measured, respectively, followed by obtaining an average value thereof.

TABLE 1

| | Insertion spacing of weave other than 1/1 plain weave | Tear strength (warp direction, N) | Tear strength (weft direction, N) | Elongation (warp direction, %) | Elongation (weft direction, %) | Tensile strength (warp direction, N/5 cm) | Tensile strength (weft direction, N/5 cm) |
|---|---|---|---|---|---|---|---|
| Example 1 | 3 | 589 | 700 | 36 | 27 | 3405 | 3309 |
| Example 2 | 5 | 614 | 708 | 38 | 29 | 3440 | 3057 |
| Example 3 | 11 | 410 | 458 | 39 | 30 | 3395 | 3128 |
| Example 4 | 13 | 307 | 366 | 40 | 30 | 3426 | 3196 |
| Example 5 | 5 | 525 | 494 | 28 | 25 | 3201 | 2863 |
| Comparative Example 1 | 0 | 256 | 305 | 41 | 32 | 3453 | 3271 |

Referring to Table 1, it has been confirmed that even if the first region of the multi-layer fabric according to an embodiment of the present disclosure is formed of two or more types of weaves including 1/1 plain weave, the multi-layer fabric exhibits significantly improved tear strength while exhibiting elongation and tensile strength almost equal to those of the double-layer fabric (Comparative Example 1) formed only with 1/1 plain weave. Accordingly, it has been confirmed that the multi-layer fabric according to the embodiment can provide an airbag that is not damaged or can minimize damage by broken glass fragments.

The invention claimed is:

1. A multi-layer fabric comprising an inflating part; and a co-woven part surrounding the inflating part,
   wherein at least one layer of the inflating part comprises a first region formed of two or more types of weaves comprising 1/1 plain weave,
   wherein the first region is formed by inserting a weave other than 1/1 plain weave every 2 to 5 1/1 plain weave,
   wherein the first region is formed of 1/1 plain weave and 2/1 twill weave.

2. The multi-layer fabric of claim 1,
   wherein the first region is formed by inserting a weave other than 1/1 plain weave every 2 to 1/1 plain weave in both warp and weft directions.

3. The multi-layer fabric of claim 1,
   wherein the first region is formed by inserting 1 to 5 weaves other than 1/1 plain weave every 2 to 1/1 plain weave.

4. The multi-layer fabric of claim 1,
   wherein the first region is included in an area ratio of 5% to 50% of a total area of the layer.

5. The multi-layer fabric of claim 1,
   wherein a region other than the first region is a second region formed of 1/1 plain weave.

6. The multi-layer fabric of claim 1,
   wherein the first region has tear strength of 300 to 800 N in the warp direction and tear strength of 350 N to 900 N in the weft direction, measured according to ISO 13937-2.

7. The multi-layer fabric of claim 1,
   wherein the first region has tensile strength of 3200 to 3500 N/5 cm in the warp direction and tensile strength of 2800 to 3300 N/5 cm in the weft direction, measured according to ISO 13934-1.

8. The multi-layer fabric of claim 1,
   wherein the first region has elongation in the warp direction of 25% to 45% and elongation in the weft direction of 20% to 40%, measured according to ISO 13934-1.

9. An airbag formed of the multi-layer fabric of claim 1.

* * * * *